United States Patent
McKinzie et al.

(10) Patent No.: US 11,628,822 B2
(45) Date of Patent: Apr. 18, 2023

(54) POWER CONTROL SYSTEM WITH STALL PREVENTION CLUTCH MODULATION FUNCTION

(71) Applicant: Deere & Company, Moline, IL (US)

(72) Inventors: Kyle K. McKinzie, Oswego, KS (US); Clayton G. Janasek, Independence, MO (US)

(73) Assignee: DEERE & COMPANY, Moline, IL (US)

( * ) Notice: Subject to any disclaimer, the term of this patent is extended or adjusted under 35 U.S.C. 154(b) by 185 days.

(21) Appl. No.: 17/171,856

(22) Filed: Feb. 9, 2021

(65) Prior Publication Data
US 2022/0250607 A1 Aug. 11, 2022

(51) Int. Cl.
*B60W 20/20* (2016.01)
*B60K 6/387* (2007.10)
(Continued)

(52) U.S. Cl.
CPC .............. *B60W 20/20* (2013.01); *B60K 6/387* (2013.01); *B60K 6/442* (2013.01); *B60K 6/543* (2013.01);
(Continued)

(58) Field of Classification Search
CPC ...... B60W 10/02; B60W 10/06; B60W 10/08; B60W 20/20; B60W 2300/152;
(Continued)

(56) References Cited

U.S. PATENT DOCUMENTS

| | | |
|---|---|---|
| 3,214,987 A | 11/1965 | Schenck et al. |
| 3,626,787 A | 12/1971 | Singer |

(Continued)

FOREIGN PATENT DOCUMENTS

| | | |
|---|---|---|
| CN | 101255907 A | 9/2008 |
| CN | 102844588 A | 12/2012 |

(Continued)

OTHER PUBLICATIONS

USPTO, Non-Final Office Action issued in U.S. Appl. No. 17/559,496 dated Aug. 31, 2022.
(Continued)

*Primary Examiner* — Edwin A Young
(74) *Attorney, Agent, or Firm* — Klintworth & Rozenblat IP LLP

(57) ABSTRACT

A control system for a work vehicle includes a power source including an engine and at least one electric motor configured to generate power; a transmission including a plurality of clutches coupled together and configured for selective engagement to transfer the power from the engine and the at least one electric motor along a power flow path to drive an output shaft of a powertrain according to a plurality of transmission modes; and a controller coupled to the power source and the transmission. The controller has a processor and memory architecture configured to: monitor an electric motor speed of the at least one electric motor; and generate and execute, when the electric motor speed is less than a first predetermined stall speed threshold, a clutch modulation command for the transmission such that at least one clutch of the plurality of clutches along the power flow path is partially engaged.

18 Claims, 5 Drawing Sheets

(51) Int. Cl.
*B60W 10/02* (2006.01)
*B60K 6/442* (2007.10)
*B60K 6/543* (2007.10)
*B60W 10/06* (2006.01)
*F16D 48/06* (2006.01)
*B60W 10/08* (2006.01)

(52) U.S. Cl.
CPC ............ *B60W 10/02* (2013.01); *B60W 10/06* (2013.01); *B60W 10/08* (2013.01); *F16D 48/06* (2013.01); *B60W 2300/152* (2013.01); *B60W 2510/081* (2013.01); *B60W 2710/02* (2013.01); *F16D 2500/10412* (2013.01); *F16D 2500/3067* (2013.01)

(58) Field of Classification Search
CPC ........ B60W 2510/081; B60W 2710/02; B60K 6/387; B60K 6/442; B60K 6/543; F16D 48/06; F16D 2500/10412; F16D 2500/3067
See application file for complete search history.

(56) References Cited

U.S. PATENT DOCUMENTS

| | | | |
|---|---|---|---|
| 3,651,904 A | 3/1972 | Snoy et al. | |
| 3,714,845 A | 2/1973 | Mooney, Jr. | |
| 3,783,711 A | 1/1974 | Orshansky, Jr. | |
| 4,090,414 A | 5/1978 | White | |
| 4,164,155 A | 8/1979 | Reed et al. | |
| 4,164,156 A | 8/1979 | Reed | |
| 5,156,577 A | 10/1992 | Fredriksen et al. | |
| 5,277,286 A * | 1/1994 | Yamamoto | F16H 61/4043 188/DIG. 1 |
| 5,353,662 A | 10/1994 | Vaughters | |
| 5,508,574 A | 4/1996 | Vlock | |
| 5,931,757 A | 8/1999 | Schmidt | |
| 6,254,509 B1 | 7/2001 | Meyer | |
| 6,394,925 B1 | 5/2002 | Wontner et al. | |
| 6,478,705 B1 | 11/2002 | Holmes et al. | |
| 6,641,505 B2 * | 11/2003 | Sayman | F16D 48/06 477/177 |
| 6,684,148 B2 | 1/2004 | Chess | |
| 7,008,342 B2 | 3/2006 | Dyck et al. | |
| 7,252,611 B2 | 8/2007 | Raghavan et al. | |
| 7,294,079 B2 | 11/2007 | Raghavan et al. | |
| 7,311,627 B2 | 12/2007 | Tarasinski | |
| 7,329,201 B2 | 2/2008 | Raghavan et al. | |
| 7,367,911 B2 | 5/2008 | Raghavan et al. | |
| 7,377,876 B2 | 5/2008 | Yang | |
| 7,399,246 B2 | 7/2008 | Holmes et al. | |
| 7,465,251 B2 | 12/2008 | Zhang | |
| 7,473,201 B2 | 1/2009 | Raghavan et al. | |
| 7,479,081 B2 | 1/2009 | Holmes | |
| 7,491,144 B2 | 2/2009 | Conlon | |
| 7,611,433 B2 | 11/2009 | Forsyth | |
| 7,901,314 B2 | 3/2011 | Salvaire et al. | |
| 7,942,776 B2 | 5/2011 | Conlon | |
| 8,234,956 B2 | 8/2012 | Love et al. | |
| 8,257,213 B2 | 9/2012 | Komada et al. | |
| 8,439,787 B2 | 5/2013 | Salamandra et al. | |
| 8,469,127 B2 | 6/2013 | Tarasinski et al. | |
| 8,500,585 B2 | 8/2013 | Kim et al. | |
| 8,573,340 B2 | 11/2013 | Tarasinski et al. | |
| 8,579,751 B2 | 11/2013 | Phillips | |
| 8,596,157 B2 | 12/2013 | Vu | |
| 8,660,724 B2 | 2/2014 | Tarasinski et al. | |
| 8,734,281 B2 | 5/2014 | Ai et al. | |
| 8,747,266 B2 | 6/2014 | Aitzetmueller et al. | |
| 8,784,246 B2 | 7/2014 | Treichel et al. | |
| 8,790,202 B2 | 7/2014 | Sakai et al. | |
| 8,944,194 B2 | 2/2015 | Glaser et al. | |
| 8,986,162 B2 | 3/2015 | Dix et al. | |
| 9,002,560 B2 | 4/2015 | Hasegawa | |
| 9,097,342 B2 | 8/2015 | Dix et al. | |
| 9,206,885 B2 | 12/2015 | Rekow et al. | |
| 9,487,073 B2 | 11/2016 | Love et al. | |
| 9,506,509 B1 | 11/2016 | Fowler et al. | |
| 9,562,592 B2 | 2/2017 | Rekow et al. | |
| 9,840,165 B2 | 12/2017 | Cox | |
| 9,840,827 B2 | 12/2017 | Miyamoto et al. | |
| 9,944,163 B2 | 4/2018 | McKinzie | |
| 9,981,665 B2 | 5/2018 | Rekow et al. | |
| 10,119,598 B2 | 11/2018 | Rekow et al. | |
| 10,670,124 B2 | 6/2020 | Rekow et al. | |
| 2001/0016536 A1 | 8/2001 | Minowa et al. | |
| 2003/0186769 A1 | 10/2003 | Ai et al. | |
| 2004/0094381 A1 | 5/2004 | Versteyhe | |
| 2004/0172184 A1 | 9/2004 | Vukovich et al. | |
| 2005/0036894 A1 | 2/2005 | Oguri | |
| 2005/0049100 A1 | 3/2005 | Ai et al. | |
| 2006/0046886 A1 | 3/2006 | Holmes et al. | |
| 2006/0111212 A9 | 5/2006 | Ai et al. | |
| 2006/0142104 A1 | 6/2006 | Saller | |
| 2006/0276291 A1 | 12/2006 | Fabry et al. | |
| 2007/0021256 A1 | 1/2007 | Klemen et al. | |
| 2007/0021257 A1 | 1/2007 | Klemen et al. | |
| 2007/0249455 A1 | 10/2007 | Hasegawa et al. | |
| 2008/0171626 A1 | 7/2008 | Pollman | |
| 2009/0250278 A1 | 10/2009 | Kawasaki et al. | |
| 2010/0048338 A1 | 2/2010 | Si | |
| 2010/0179009 A1 | 7/2010 | Wittkopp et al. | |
| 2010/0261565 A1 | 10/2010 | Ai et al. | |
| 2011/0130235 A1 | 6/2011 | Phillips | |
| 2012/0157254 A1 | 6/2012 | Aitzetmueller et al. | |
| 2013/0023370 A1 | 1/2013 | Grad et al. | |
| 2013/0123055 A1 | 5/2013 | Mattsson et al. | |
| 2013/0173126 A1* | 7/2013 | Ruebsam | B60K 23/02 701/67 |
| 2013/0211655 A1 | 8/2013 | Ogata et al. | |
| 2013/0231815 A1 | 9/2013 | Tanishima et al. | |
| 2013/0325238 A1 | 12/2013 | Kato et al. | |
| 2014/0018201 A1 | 1/2014 | Tolksdorf | |
| 2014/0248986 A1 | 4/2014 | Weeramantry et al. | |
| 2014/0128196 A1 | 5/2014 | Rintoo | |
| 2014/0128217 A1 | 5/2014 | Tabata et al. | |
| 2014/0315685 A1 | 10/2014 | Holler | |
| 2015/0006007 A1 | 1/2015 | Kitahata et al. | |
| 2015/0072823 A1 | 3/2015 | Rintoo | |
| 2015/0142232 A1 | 5/2015 | Tabata et al. | |
| 2015/0142282 A1 | 5/2015 | Lee et al. | |
| 2015/0183436 A1 | 7/2015 | Rekow et al. | |
| 2015/0184726 A1 | 7/2015 | Rekow et al. | |
| 2015/0292608 A1 | 10/2015 | McKinzie | |
| 2016/0090091 A1 | 3/2016 | Gugel et al. | |
| 2016/0201295 A1 | 7/2016 | Kishimoto et al. | |
| 2016/0272059 A1 | 9/2016 | Watanabe et al. | |
| 2017/0066447 A1 | 3/2017 | Hertel et al. | |
| 2017/0102059 A1 | 4/2017 | Rekow et al. | |
| 2017/0129477 A1 | 5/2017 | Ideshio et al. | |
| 2017/0203646 A1 | 7/2017 | Mueller et al. | |
| 2017/0284508 A1 | 10/2017 | Devreese | |
| 2017/0284517 A1 | 10/2017 | Rekow et al. | |
| 2017/0328453 A1 | 11/2017 | McKinzie et al. | |
| 2018/0022353 A1* | 1/2018 | Thompson | B60W 20/00 701/22 |
| 2018/0043764 A1 | 2/2018 | McKinzie et al. | |
| 2018/0056982 A1 | 3/2018 | Endo et al. | |
| 2018/0149247 A1 | 5/2018 | Rekow et al. | |
| 2018/0298993 A1 | 10/2018 | Fliearman et al. | |
| 2019/0118642 A1 | 4/2019 | Cho et al. | |
| 2019/0337376 A1 | 11/2019 | Ore | |
| 2019/0344654 A1 | 11/2019 | Kaltenbach et al. | |
| 2019/0346036 A1 | 11/2019 | Ore et al. | |
| 2019/0389298 A1 | 12/2019 | Kaltenbach et al. | |
| 2020/0309258 A1 | 10/2020 | McKinzie et al. | |

FOREIGN PATENT DOCUMENTS

| | | |
|---|---|---|
| DE | 1173348 B | 7/1964 |
| DE | 4010919 A1 | 10/1991 |
| DE | 4131572 A1 | 3/1993 |
| DE | 19621200 A1 | 11/1997 |

(56) References Cited

FOREIGN PATENT DOCUMENTS

| | | |
|---|---|---|
| DE | 19954636 A1 | 5/2001 |
| DE | 201500200973 A1 | 5/2001 |
| DE | 10128076 A1 | 12/2002 |
| DE | 10319252 A1 | 11/2004 |
| DE | 102006041160 A1 | 9/2008 |
| DE | 202009007972 U1 | 5/2010 |
| DE | 11545 U1 | 12/2010 |
| DE | 102010026460 A1 | 3/2011 |
| DE | 102012216781 A1 | 3/2011 |
| DE | 102008032320 A1 | 6/2011 |
| DE | 102010021846 A1 | 12/2011 |
| DE | 10201102210 A1 | 7/2012 |
| DE | 102011102184 A1 | 7/2012 |
| DE | 112006002537 B4 | 8/2012 |
| DE | 10201105868 A1 | 1/2013 |
| DE | 102011115002 A1 | 4/2013 |
| DE | 102013009649 A1 | 12/2014 |
| DE | 102013220167 A1 | 4/2015 |
| DE | 202015102282 U1 | 5/2015 |
| DE | 102014225298 A1 | 7/2015 |
| DE | 102015215461 A1 | 2/2016 |
| DE | 102015220635 A1 | 5/2016 |
| DE | 102015205932 A1 | 10/2016 |
| DE | 112006000524 B4 | 2/2017 |
| DE | 102016116324 A1 | 3/2017 |
| DE | 102016120965 A1 | 5/2017 |
| DE | 102016204727 A1 | 9/2017 |
| DE | 102018108510 A1 | 10/2018 |
| DE | 102018209940 A1 | 12/2018 |
| DE | 102018212712 A1 | 1/2019 |
| DE | 102019204706 A1 | 11/2019 |
| DE | 102019205211 A1 | 11/2019 |
| DE | 102018213871 A1 | 2/2020 |
| DE | 102020003597 A1 | 9/2020 |
| DE | 102020209003 A1 | 3/2021 |
| DE | 102020211888 A1 | 5/2021 |
| DE | 102020215219 A1 | 6/2021 |
| EP | 01099882 A2 | 10/1991 |
| EP | 805059 A2 | 11/1997 |
| EP | 01707416 | 8/2007 |
| EP | 02855226 | 8/2007 |
| EP | 02466168 | 6/2012 |
| EP | 02466169 | 6/2012 |
| EP | 2631144 B1 | 8/2013 |
| EP | 2682531 A1 | 8/2014 |
| EP | 2832567 A1 | 4/2015 |
| JP | 6462174 B1 | 1/2019 |
| WO | 2007017975 A1 | 2/2007 |
| WO | 2008019799 A2 | 2/2008 |
| WO | 2011092643 A1 | 8/2011 |
| WO | 2012171812 A1 | 12/2012 |
| WO | 2017107848 A1 | 6/2017 |

OTHER PUBLICATIONS

USPTO, Non-Final Office Action issued in U.S. Appl. No. 17/538,691 dated Sep. 15, 2022.
USPTO, Non-Final Office Action issued in U.S. Appl. No. 17/066,746 dated Oct. 26, 2021.
German Search Report issued in counterpart application No. 102017220666.7 dated May 28, 2021. (10 pages).
German Search Report issued in application No. DE102021212506.9 with translation, dated Jun. 20, 2022. (24 pages).
German Search Report issued in counterpart application No. 102020209003.3 dated Jul. 17, 2021 (10 pages).
German Search Report issued in application No. DE102021209495.3 with translation, dated Jan. 11, 2022 (24 pages).
German Search Report issued in counterpart application No. 102020209003.3 dated Apr. 15, 2021 (10 pages).
German Search Report issued in application No. 102020213675.0 dated Mar. 17, 2021. (10 pages).
USPTO, Final Office Action issued in U.S. Appl. No. 16/555,913 dated Apr. 20, 2021.
German Search Report issued in application No. DE102021214746.1 dated Jun. 30, 2022 (12 pages).
USPTO, Non-Final Office Action issued in U.S. Appl. No. 17/154,729 dated Jul. 15, 2022. (7 pages).
Extended European Search Report issued in counterpart application No. 20205965.5 dated Jul. 28, 2021 (10 pages).
Schmetz, Roland, Electromechanische Traktorgetriebe Getriebe mit Zukunft, Electromechanical Tractor Units—Gearboxes with a Future, Landtechnik, Agricultural Engineering, vol. 54; Issue 2; pp. 72-73, Feb. 1999.
John M. Miller, Hybrid Electric Vehicle Propulsion System Architectures of the e-CVT Type, IEEE Transactions on Power Electronics, vol. 21, No. 3, May 2006.
Jian Dong, Zuomin Dong, Curran Crawford, Review of Continuously Variable Transmission Powertrain System for Hybrid Electric Vehicles, Proceedings of the ASME 2011 International Mechanical Engineering Congress & Exposition, IMECE2011-63321, Nov. 11-17, 2011.
CNIPA Office Action for Application No. 201510165982.4 dated Aug. 9, 2018, Serial Notice No. 2018080601675890.
German Search Report for application No. 10215206174 dated Jul. 16, 2015.
German Search Report for application No. 1020182036705 dated Dec. 20, 2018.
German Search Report for application No. 102018210616 dated Feb. 1, 2019.
German Search Report for application No. 1020182099391 dated Feb. 27, 2019.
German Search Report for application No. 1020182099405 dated Feb. 28, 2019.
German Search Report for application No. 102018212712 dated Apr. 12, 2019.
German Search Report for application No. 102019205211 dated Sep. 5, 2019.
German Search Report for application No. 102019204706 dated Dec. 17, 2019.
German Search Report for German application No. 1020202026513 dated Sep. 1, 2020.
USPTO, Office Action in U.S. Appl. No. 14/249,258 dated Apr. 21, 2017.
USPTO, Office Action in U.S. Appl. No. 14/249,258 dated Aug. 22, 2017.
USPTO, Office Action in U.S. Appl. No. 14/249,258 dated Oct. 17, 2016.
USPTO, Office Action in U.S. Appl. No. 14/536,097 dated Sep. 25, 2017.
USPTO, Office Action in U.S. Appl. No. 15/664,289 dated Jul. 26, 2018.
USPTO, Office Action in U.S. Appl. No. 15/664,289 dated Dec. 13, 2018.
USPTO, Office Action in U.S. Appl. No. 15/485,911 dated Feb. 8, 2019.
USPTO, Office Action in U.S. Appl. No. 15/793,522 dated Apr. 18, 2019.
USPTO, Office Action in U.S. Appl. No. 15/879,796 dated Aug. 23, 2019.
USPTO, Office Action in U.S. Appl. No. 15/628,979 dated Nov. 5, 2019.
USPTO, Office Action in pending U.S. Appl. No. 15/971,867 dated Dec. 12, 2019.
USPTO, Office Action in U.S. Appl. No. 16/371,598 dated Jul. 21, 2020.
USPTO, Final Office Action in U.S. Appl. No. 15/971,867 dated Jun. 24, 2020.
USPTO, Non-Final Office Action issued in U.S. Appl. No. 16/555,913 dated Jan. 4, 2021.
Deere & Company, U.S. Appl. No. 16/670,210, filed Oct. 31, 2019.
Deere & Company, U.S. Appl. No. 16/555,913, filed Aug. 29, 2019.
Deere & Company, U.S. Appl. No. 16/946,685, filed Jul. 1, 2020.
Deere & Company, U.S. Appl. No. 17/066,746, filed Oct. 9, 2020.
Deere & Company, U.S. Appl. No. 17/154,729, filed Jan. 21, 2021.

* cited by examiner

POWER CONTROL SYSTEM WITH STALL PREVENTION CLUTCH MODULATION FUNCTION

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates a control system for a work vehicle, and more specifically to a power control system for a transmission and an electric motor of the work vehicle.

BACKGROUND OF THE DISCLOSURE

In the agriculture, construction and forestry industries, work vehicles, including wheel loaders, may be utilized to perform a number of different tasks. Modern work vehicles may use power from multiple power sources, including both a traditional engine (e.g., an internal combustion engine) and one or more continuously variable power sources (CVP) (e.g., an electric motor) to provide useful power. In various applications, the powertrain of the work vehicle may use power selectively provided solely by either power source or in combined form via an infinitely variable transmission (IVT) or continuously variable transmission (CVT) according to modes. Moreover, each mode may have one or more gear (or speed) ratios as clutches are selectively engaged and disengaged to vary the power flow path. Some operating conditions may provide challenges for certain modes of one or both types of power sources.

SUMMARY OF THE DISCLOSURE

The disclosure provides a power control system for a work vehicle.

In one aspect, the disclosure provides a control system for a work vehicle. The system includes a power source including an engine and at least one electric motor configured to generate power; a transmission including a plurality of clutches coupled together and configured for selective engagement to transfer the power from the engine and the at least one electric motor along a power flow path to drive an output shaft of a powertrain of the work vehicle according to a plurality of transmission modes; and a controller coupled to the power source and the transmission. The controller has a processor and memory architecture configured to: monitor an electric motor speed of the at least one electric motor; and generate and execute, when the electric motor speed is less than a first predetermined stall speed threshold, a clutch modulation command for the transmission such that at least one clutch of the plurality of clutches along the power flow path is partially engaged.

In another aspect, the disclosure provides a controller for a work vehicle with an engine and at least one electric motor configured to generate power and a transmission with a plurality of clutches coupled together and configured for selective engagement to transfer the power from the engine and the at least one electric motor along a power flow path to drive an output shaft according to a plurality of transmission modes. The controller includes a processor and memory architecture configured to: monitor an electric motor speed of the at least one electric motor; and generate and execute, when the electric motor speed is less than a first predetermined stall speed threshold, a clutch modulation command for the transmission such that at least one clutch of the plurality of clutches along the power flow path is partially engaged.

In a further aspect, the disclosure provides a method of operating a powertrain of a work vehicle with an engine and at least one electric motor configured to generate power and a transmission with a plurality of clutches coupled together and configured for selective engagement to transfer the power from the engine and the at least one electric motor along a power flow path to drive an output shaft according to a plurality of transmission modes. The method includes monitoring, with a controller, an electric motor speed of the at least one electric motor; and generating and executing, at the controller, a clutch modulation command for the transmission such that at least one clutch of the plurality of clutches along the power flow path is partially engaged when the electric motor speed is less than a first predetermined stall speed threshold The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
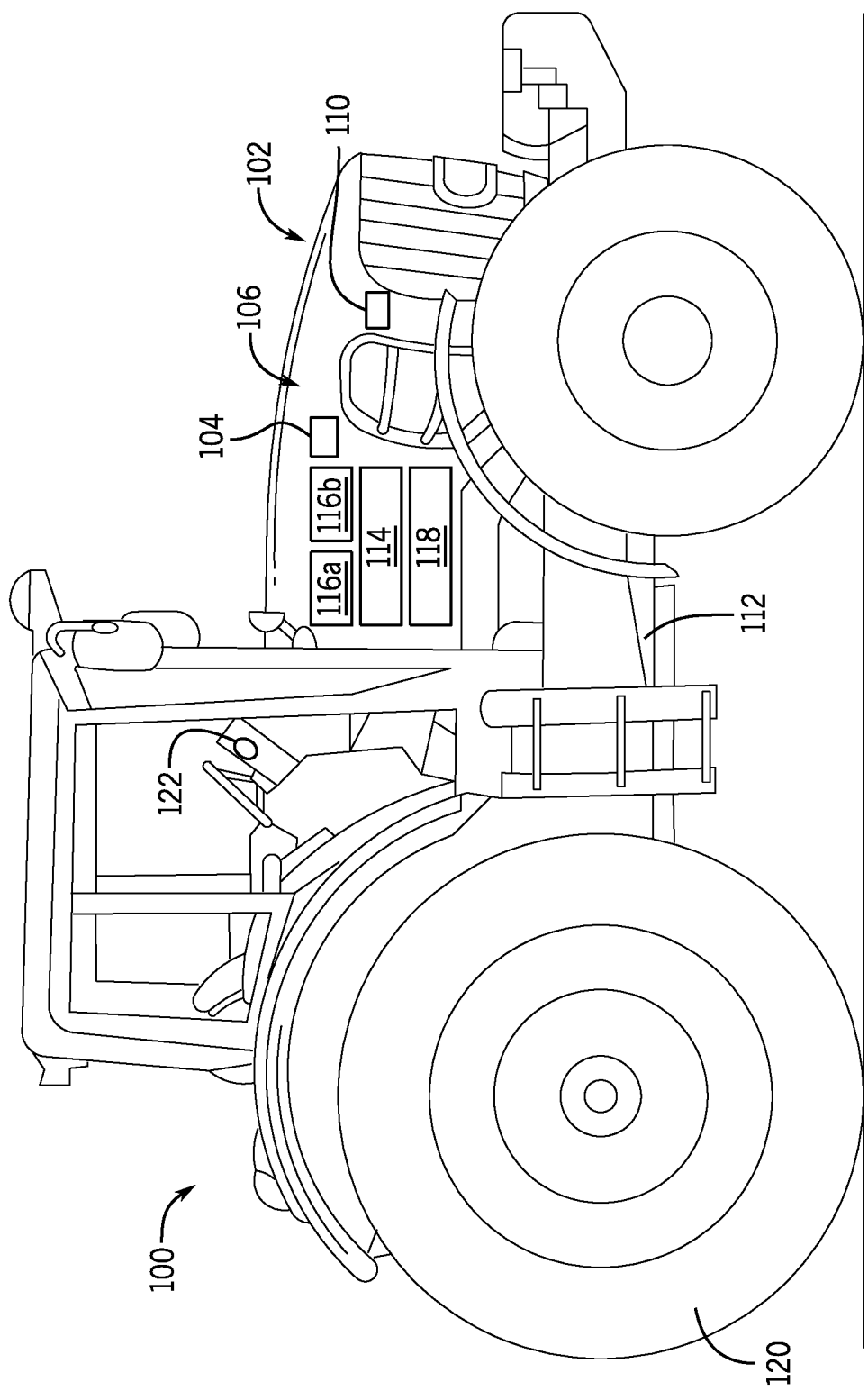
FIG. 1 is a side view of an example work vehicle that uses a power control system having a clutch modulation function for motor stall prevention in accordance with an example embodiment of this disclosure.

The following describes one or more example embodiments of the disclosed power control system, powertrain, or vehicle, as shown in the accompanying figures of the drawings described briefly above. Various modifications to the example embodiments may be contemplated by one of skill in the art.

Typically, work vehicles, such as those in the agriculture, construction and forestry industries, may include a power control system implemented with a powertrain having an engine and one or more additional power sources, such as one or more electric motors, that individually and collectively provide power via a transmission to drive the vehicle and perform work functions. For example, the power control system may implement one or more split modes in which power from the engine and electric motor are combined in the transmission to provide output torque; one or more direct drive modes in which power from only the engine provides the output torque; and one or more series modes in which power from primarily the electric motor provides the output torque. Such a transmission may be considered a hybrid transmission, an infinitely variable transmission (IVT), or an electrical infinitely variable transmission (eIVT); and such a powertrain may be considered a hybrid, IVT, or eIVT powertrain. Within each mode, the clutches of the transmission may be manipulated to provide or more gear or speed ratios.

During typical operation, the power control system may be subject to relatively heavy loads, including loads that may stop and slow the work vehicle, despite the application of torque. In certain modes, particularly in series modes (e.g., in which the output torque is provided by one or more of the electric motors), the reduction in speed of the vehicle may slow the electric motor to a value that is less than the electric motor stall speed. Typically, upon reaching the stall speed, the controller may derate the electric motor to avoid heat management issues. As such, in these situations, the electric motor may not be able to provide the desired torque for the work vehicle, thereby potentially impacting vehicle performance and efficiency.

However, according to the present disclosure, the power control system is configured to implement a clutch modulation function in certain conditions to suitably address the potential impact of a slowing electric motor. In one example, the conditions associated with the clutch modulation function may include the current mode of the transmission and/or the current electric motor speed. In particular, the clutch modulation function may be implemented when the transmission mode is a series mode and when the current electric motor speed is approaching, fallen below, or at the electric motor stall speed. Upon implementation, the power control system may generate commands to modulate at least one of the clutches in the transmission, particularly one of the clutches in the power flow path of the transmission that couples the electric motor to the output shaft. In one example, the power control system may implement the clutch modulation by dithering the selected clutch (e.g., rapid increase and decreases in the resultant pressure at the clutch), while in other examples, the power control system may implement the clutch modulation by targeting an intermediate or partially engaged resultant pressure at the clutch. The clutch modulation function operates to partially decouple the electric motor from the transmission such that the electric motor may obtain and/or maintain speeds that are above the electric motor stall speed and avoid or mitigate the resulting derating, thereby maintaining torque capability of the electric motor. As such, the present disclosure may enable a power control system with an electric motor stall prevention clutch modulation function that provides consistent and reliable performance and efficiency, particularly without needing to size a larger motor for high torque, low speed applications. Additional details will be provided below.

Referring to FIG. 1, a work vehicle 100 may include or otherwise implement a power control system 102 that executes a clutch modulation function to ensure appropriate electric motor speed and torque capability, thereby providing consistent and smooth operation of the work vehicle 100. The view of FIG. 1 generally reflects the work vehicle 100 as a tractor. It will be understood, however, that other configurations in the agricultural, construction, and/or forestry industries may be possible, including configurations as a wheel loader. It will further be understood that the disclosed powertrain 106 may also be used in non-work vehicles and non-vehicle applications (e.g., fixed-location power installations). In one example, the power control system 102 may be considered to include or otherwise interact with a controller 104, a powertrain 106, and one or more sensors 110 supported on the chassis 112 of the work vehicle 100.

Generally, the powertrain 106 includes one or more sources of power, such as an engine 114 (e.g., a diesel engine) and/or one or more continuously variable power sources (CVPs) 116a, 116b. Typically, the CVPs 116a, 116b are electric motors and will be referred to below as such. However, in other embodiments, the CVPs 116a, 116b may be other continuously variable power sources, such as hydraulic motors. The electric motors 116a, 116b may be associated with or otherwise incorporate one or more power components that condition, store, and/or convert power to and/or from the motors 116a, 116b. Such power components may include one or more sensors, controllers, batteries and/or inverters (e.g., semiconductor devices with insulated-gate bipolar transistors (IGBTs)). As noted above, if unaddressed, a reduction of speed of the electric motor 116a, 116b (particularly motor 116b coupled to selectively drive transmission 118) may result in a derating of the torque capability to avoid heat issues in the IGBTs. The clutch modulation function operates to identify and address these conditions to prevent undue heating of the power components, derating of the electric motors 116a, 116b (e.g., a reduction in torque capability), and ensure consistent and efficient operation of the powertrain 106, as described in greater detail below.

The powertrain 106 further includes a transmission 118 that transfers power from the power sources 114, 116a, 116b to a suitable driveline coupled to one or more driven wheels (or tracks) 120 to enable propulsion of the work vehicle 100. The wheels 120 interact directly with a support surface and are responsible for vehicle 100 movement and tractive effort. The transmission 118 may also supply power to drive other vehicle systems, components, or implements. The transmission 118 may include various gears, shafts, clutches, and other power transfer elements that may be operated in a variety of ranges representing selected output speeds and/or torques. As described in greater detail below, the power control system 102 is used to implement the clutch modulation function at one or more conditions within the powertrain 106.

Generally, the controller 104 implements operation of the power control system 102, powertrain 106, and other aspects of the vehicle 100, including any of the functions described herein. The controller 104 may be configured as computing devices with associated processor devices and memory architectures, as hydraulic, electrical or electro-hydraulic controllers, or otherwise. As such, the controller 104 may be configured to execute various computational and control functionality with respect to the vehicle 100. The controller 104 may be in electronic, hydraulic, or other communication with various other systems or devices of the vehicle 100, including via a CAN bus (not shown). For example, the controller 104 may be in electronic or hydraulic communication with various actuators, sensors, and other devices within (or outside of) the vehicle 100.

In some embodiments, the controller 104 may be configured to receive input commands and to interface with an operator via a human-machine interface or operator interface 122, including typical steering, acceleration, velocity, transmission, and wheel braking controls, as well as other suitable controls. The operator interface 122 may be configured in a variety of ways and may include one or more joysticks, various switches or levers, one or more buttons, a touch-screen interface that may be overlaid on a display, a keyboard, a speaker, a microphone associated with a speech recognition system, or various other human-machine interface devices. The controller 104 may also receive inputs from one or more sensors 110 associated with the various system and components of the work vehicle 100, as discussed in greater detail below. As also discussed below, the controller 104 may implement the power control system 102 based on these inputs to generate suitable commands for the powertrain 106, particularly with respect to the clutch modulation function.

As noted above, the work vehicle 100 may include one or more sensors (generally represented by sensor 110) in communication to provide various types of feedback and data with the controller 104 in order to implement the functions described herein, as well as functions typical for a work vehicle 100. In certain applications, sensors 110 may be provided to observe various conditions associated with the work vehicle 100. In one example, the sensors 110 may provide information associated with the power control system 102 to implement the clutch modulation function. The sensors 110 may include kinematic sensors that collect information associated with the position and/or movement of the work vehicle 100, such as one or more directional sensors and/or one or more ground speed sensors. Additional sensors (or otherwise, sources or data) may provide or include sources of powertrain data, including data sufficient to determine the current or anticipated mode of the transmission 118, information associated with the positions and states of one or more transmission clutch elements, and torque and/or speed information associated with the electric motors 116a, 116b, engine 114, and/or elements of the transmission 118. In particular, the sensors 110 may collect information associated with the current motor speed, clutch element speeds, transmission output speed, ground speed, and the like, e.g., directly or derived from other parameters.

As described in greater detail below, the power control system 102 operates to implement the clutch modulation function to prevent electric motor stall. The clutch modulation function is particularly useful in a hybrid powertrain system (e.g., with electric motor and engine power sources). An example powertrain 106 is depicted and discussed below with reference to FIG. 2 as implementing aspects of the power control system 102, and subsequently, additional details about the power control system 102 implementing the clutch modulation function are provided with reference to FIG. 3.

Figure 2:
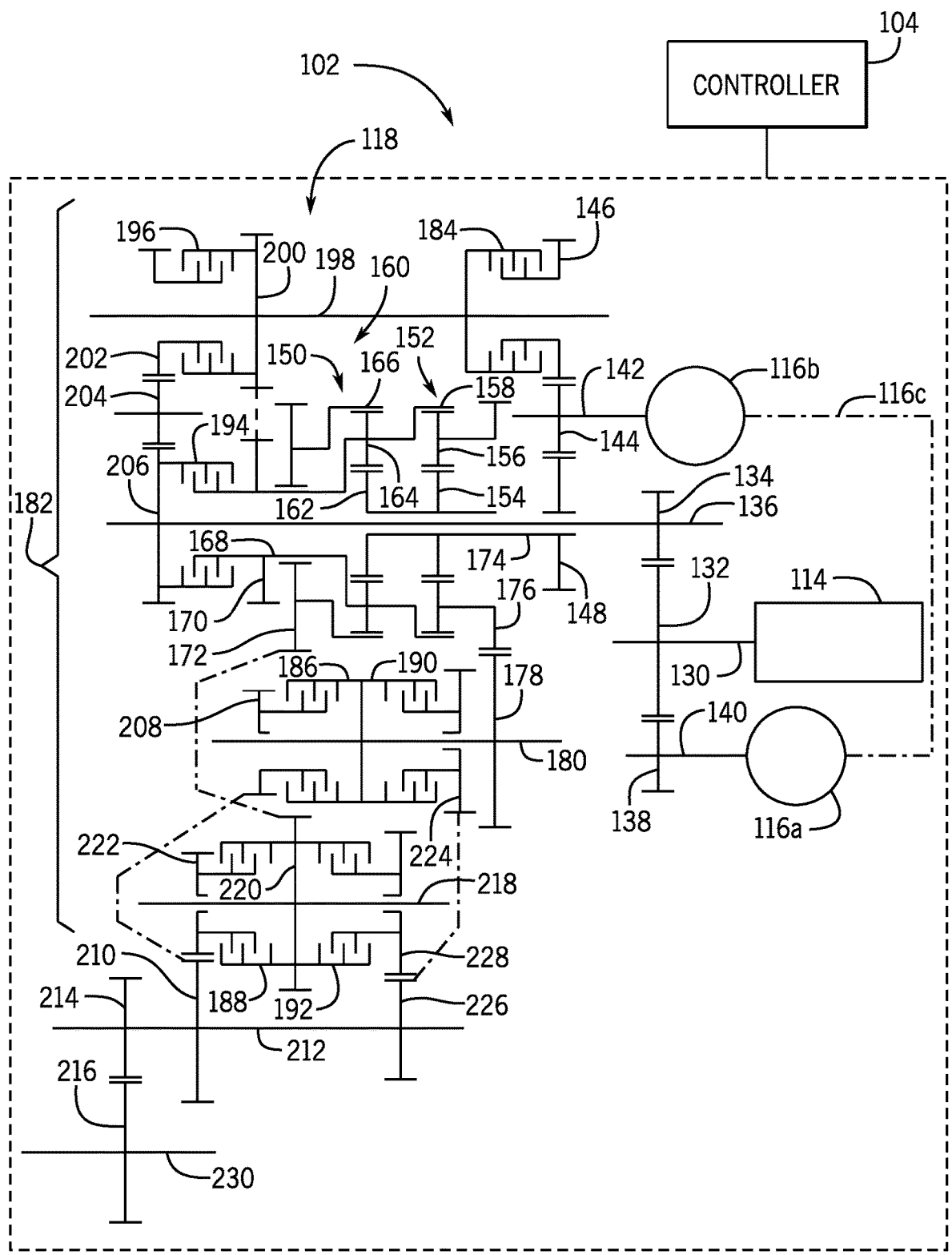
FIG. 2 is a powertrain for implementing the clutch modulation function of the power control system of the example work vehicle of FIG. 1 in accordance with an example embodiment.

Referring to FIG. 2 and as introduced above, the power control system 102 may be considered to include powertrain 106 and the controller 104, which is in communication with the various components of the powertrain 106 and additionally receives information from various vehicle systems and/or sensors 110 (FIG. 1). As also noted above, the powertrain 106 may include one or more power sources 114, 116a, 116b. In particular, the powertrain 106 may include the engine 114, which may be an internal combustion engine of various known configurations; and further the powertrain 106 may also include the first electric motor 116a and the second electric motor 116b, which may be connected together by a conduit and/or other power components 116c. The powertrain 106 includes the transmission 118 that transfers power from the engine 114, first electric motor 116a, and/or electric motor 116b to an output shaft 230. As described below, the transmission 118 includes a number of gearing, clutch, and control assemblies to suitably drive the output shaft 230 at different speeds in multiple directions. Generally, in one example, the transmission 118 of powertrain 106 for implementing the power control system 102 may be any type of infinitely variable transmission arrangement.

The engine 114 may provide rotational power via an engine output element, such as a flywheel, to an engine shaft 130 according to commands from the controller 104 based on the desired operation. The engine shaft 130 may be configured to provide rotational power to a gear 132. The gear 132 may be enmeshed with a gear 134, which may be supported on (e.g., fixed to) a shaft 136. The shaft 136 may be substantially parallel to and spaced apart from the engine shaft 130. The shaft 136 may support various components of the powertrain 106 as will be discussed in detail.

The gear 132 may also be enmeshed with a gear 138, which is supported on (e.g., fixed to) a shaft 140. The shaft 140 may be substantially parallel to and spaced apart from the engine shaft 130, and the shaft 140 may be connected to the first electric motor 116a. Accordingly, mechanical power from the engine (i.e., engine power) may transfer via the engine shaft 130, to the enmeshed gears 132, 138, to the shaft 140, and to the first electric motor 116a. The electric motor 116a may convert this power to an alternate form (e.g., electrical power) for transmission over the conduit 116c to the second electric motor 116b. This converted and transmitted power may then be re-converted by the second electric motor 116b for mechanical output along a shaft 142. As introduced above, various control devices (not shown) may be provided to regulate such conversion, transmission, re-conversion, and so on. Also, in some embodiments, the shaft 142 may support a gear 144 (or other similar component). The gear 144 may be enmeshed with and may transfer power to a gear 146. The gear 144 may also be enmeshed with and may transfer power to a gear 148. Accordingly, power from the second electric motor 116b may be divided between the gear 146 and the gear 148 for transmission to other components as will be discussed in more detail below. The powertrain 106 may further include a variator 150 that represents one example of an arrangement that enables an infinitely variable power transmission between the engine 114 and electric motors 116a, 116b and the output shaft 230. As discussed below, this arrangement further enables the power control system 102 in which mechanical energy from the engine 114 may be used to boost the electric power in a series mode. Other arrangements of the variator 150, engine 114, and electric motors 116a, 116b may be provided.

In some embodiments, the variator 150 may include at least two planetary gearsets. In some embodiments, the planetary gearset may be interconnected and supported on a common shaft, such as the shaft 136, and the planetary gearsets 152, 160 may be substantially concentric. In other embodiments, the different planetary gearsets 152, 160 may be supported on separate, respective shafts that are nonconcentric. The arrangement of the planetary gearsets may be configured according to the available space within the work vehicle 100 for packaging the powertrain 106.

As shown in the embodiment of FIG. 2, the variator 150 may include a first planetary gearset (i.e., a "low" planetary gearset) 152 with a first sun gear 154, first planet gears and associated carrier 156, and a first ring gear 158. Moreover, the variator 150 may include a second planetary gearset (i.e., a "high" planetary gearset) 160 with a second sun gear 162, second planet gears and associated carrier 164, and a second ring gear 166. The second planet gears and carrier 164 may be directly attached to the first ring gear 158. Also, the second planet gears and carrier 164 may be directly attached to a shaft 168 having a gear 170 fixed thereon. Moreover, the second ring gear 166 may be directly attached to a gear 172. As shown, the shaft 168, the gear 170, and the gear 172 may each receive and may be substantially concentric to the shaft 136. Although not specifically shown, it will be appreciated that the powertrain 106 may include various bearings for supporting these components concentrically. Specifically, the shaft 168 may be rotationally attached via a bearing to the shaft 136, and the gear 172 may be rotationally attached via another bearing on the shaft 168.

On the opposite side of the variator 150 (from left to right in FIG. 2), the gear 148 may be mounted (e.g., fixed) on a shaft 174, which also supports the first and second sun gears 154, 162. In some embodiments, the shaft 174 may be hollow and may receive the shaft 136. A bearing (not shown) may rotationally support the shaft 174 on the shaft 136 substantially concentrically. Furthermore, the first planet gears and associated carrier 156 may be attached to a gear 176. The gear 176 may be enmeshed with a gear 178, which is fixed to a shaft 180. The shaft 180 may be substantially parallel to and spaced apart from the shaft 136.

As noted above, the powertrain 106 may be configured for delivering power (from the engine 114, the first electric motor 116a, and/or the second electric motor 116b) to the output shaft 230 or other output component via the transmission 118. The output shaft 230 may be configured to transmit this received power to wheels of the work vehicle 100, to a power take-off (PTO) shaft, to a range box, to an implement, or other component of the work vehicle 100.

The powertrain 106 may have a plurality of selectable modes, such as direct drive modes, split path modes, and series modes. In a direct drive mode, power from the engine 114 may be transmitted to the output shaft 230, and power from the second electric motor 116b may be prevented from transferring to the output shaft 230. In a split path mode, power from the engine 114 and the second electric motor 116b may be summed by the variator 150, and the summed or combined power may be delivered to the output shaft 230. Moreover, in a series mode, power from the second electric motor 116b may be transmitted to the output shaft 230 and power from the engine 114 may be generally prevented from transferring to the output shaft 230. The powertrain 106 may also have different speed modes in one more of the direct drive, split path, and series modes, and these different speed modes may provide different angular speed ranges for the output shaft 230. The powertrain 106 may switch between the plurality of modes to maintain suitable operating efficiency. Furthermore, the powertrain 106 may have one or more forward modes for moving the work vehicle 100 in a forward direction and one or more reverse modes for moving the work vehicle 100 in a reverse direction. The powertrain 106 may implement different modes and speeds, for example, using a control assembly 182. The control assembly 182 may include one or more selectable transmission components. The selectable transmission components may have first positions or states (engaged positions or states), in which the respective device transmits effectively all power from an input component to an output component. The selectable transmission components may also have a second position or states (disengaged positions or states), in which the device prevents power transmission from the input to the output component. The selectable transmission components may have third positions or states (partially engaged or modulated positions or states), in which the respective device transmits only a portion of the power from an input component to an output component. Unless otherwise noted, the term "engaged" refers to the first position or state in which effectively all of the power is transferred, whereas "partially engaged", "modulated", or "dithered" specifically refers to only the partial transfer of power, albeit potentially with different characteristics. The selectable transmission components of the control assembly 182 may include one or more wet clutches, dry clutches, dog collar clutches, brakes, synchronizers, or other similar devices. The control assembly 182 may also include an actuator for actuating the selectable transmission components between the first, second, and third positions.

As shown in FIG. 2, the control assembly 182 may include a first clutch 184, a second clutch 186, a third clutch 188, a fourth clutch 190, and a fifth clutch 192. Also, the control assembly 182 may include a forward directional clutch 194 and a reverse directional clutch 196.

In one example, the first clutch 184 may be mounted and supported on a shaft 198. Also, the first clutch 184, in an engaged position, may engage the gear 146 with the shaft 198 for rotation as a unit. The first clutch 184, in a disengaged position, may allow the gear 146 to rotate relative to the shaft 198. Also, a gear 200 may be fixed to the shaft 198, and the gear 200 may be enmeshed with the gear 170 that is fixed to the shaft 168. The reverse directional clutch 196 may be supported on the shaft 198 (i.e., commonly supported on the shaft 198 with the first clutch 184). The reverse directional clutch 196 may engage and, alternatively, disengage the gear 200 and a gear 202. The gear 202 may be enmeshed with an idler gear 204, and the idler gear 204 may be enmeshed with a gear 206. The forward directional clutch 194 may be supported on gear 206, which is in turn supported on the shaft 136, to selectively engage shaft 168. Thus, the forward directional clutch 194 may be concentric with both the shaft 168 and the shaft 136. The second clutch 186 may be supported on the shaft 180. The second clutch 186 may engage and, alternatively, disengage the shaft 180 and a gear 208. The gear 208 may be enmeshed with a gear 210. The gear 210 may be fixed to and mounted on a countershaft 212. The countershaft 212 may also support a gear 214. The gear 214 may be enmeshed with a gear 216, which is fixed to the output shaft 230.

The third clutch 188 may be supported on a shaft 218. The shaft 218 may be substantially parallel and spaced at a distance from the shaft 180. Also, a gear 220 may be fixed to and supported by the shaft 218. The gear 220 may be enmeshed with the gear 172 as shown. The third clutch 188 may engage and, alternatively, disengage the gear 220 and a gear 222. The gear 222 may be enmeshed with the gear 210. The fourth clutch 190 may be supported on the shaft 180 (in common with the second clutch 186). The fourth clutch 190 may engage and, alternatively, disengage the shaft 180 and a gear 224. The gear 224 may be enmeshed with a gear 226, which is mounted on and fixed to the countershaft 212. Additionally, the fifth clutch 192 may be supported on the shaft 218 (in common with and concentric with the third clutch 188). The fifth clutch 192 may engage and, alternatively, disengage the shaft 218 and a gear 228. The gear 228 may be enmeshed with the gear 226.

The different transmission modes of the powertrain 106 will now be discussed. Like the embodiments discussed above, the powertrain 106 may have at least one at least one split path mode in which power from the engine 114 and one or more of the electric motors 116a, 116b are combined. Also, the powertrain 106 may additionally have a direct drive mode and/or and at least one generally series mode (i.e., electric motor-only mode).

In some embodiments, engaging the first clutch 184 and the second clutch 186 may place the powertrain 106 in a first forward mode. Generally, this mode may be a series mode (i.e., electric motor-only mode). In this mode, mechanical power from the engine 114 may flow via the shaft 130, the gear 132, the gear 138, and the shaft 140 to the first electric motor 116a. The first electric motor 116a may convert this input mechanical power to electrical or hydraulic power and supply the converted power to the second electric motor 116b. Also, power from the engine 114 that flows via the shaft 130, the gear 132, and the gear 134 to the shaft 136 is nominally prevented from being input into the variator 150. Moreover, mechanical power from the second electric motor 116b may rotate the shaft 142 and the attached gear 144. This power from the electric motor 116b may rotate the gear 148 for rotating the first sun gear 154. The power may also rotate the gear 146, which may transfer across the first clutch 184 to the shaft 198, to the gear 200, to the gear 170, to the shaft 168, to the second planet gears and associated carrier 164, to the first ring gear 158. In other words, in this mode, power from the second from the electric motor 116b 116b may drivingly rotate two components of the variator 150 (the first sun gear 154 and the first ring gear 158), and the power may be summed and re-combined at the first planet gears and associated carrier 156. The re-combined power may transfer via the gear 176 and the gear 178 to the shaft 180. Power at the shaft 180 may be transferred across the second clutch 186 to the gear 208, to the gear 210, along the countershaft 212, to the gear 214, to the gear 216, and ultimately to the output shaft 230. In some embodiments, the series mode may provide the output shaft 230 with relatively high torque at low angular speed output. Thus, this mode may be referred to as a creeper mode in some embodiments. Furthermore, as will become evident, the first clutch 184 may be used only in this mode; therefore, the first clutch 184 may be referred to as a "creeper clutch". In other words, the second electric motor 116b rotates the first sun gear 154 and the first ring gear 158, and the power from the second electric motor 116b recombines at the first planet gears and carrier 156 as a result.

In some embodiments, engaging the forward directional clutch 194 and the second clutch 186 may place the powertrain 106 in a first forward directional mode. This mode may be a split path mode in which the variator 150 sums power from the second electric motor 116b and the engine 114 and outputs the combined power to the output shaft 230. Specifically, power from the second electric motor 116b is transmitted from the shaft 142, to the gear 144, to the gear 148, to the shaft 174, to drive the first sun gear 154. Also, power from the engine 114 is transmitted to the shaft 130, to the gear 132, to the gear 134, to the shaft 136, to the gear 206, through the forward directional clutch 194, to the shaft 168, to the second planet gears and associated carrier 164 to the first ring gear 158. Combined power from the second electric motor 116b and the engine 114 is summed at the first planet gears and the associated carrier 156 and is transmitted via the gear 176 and the gear 178 to the shaft 180. Power at the shaft 180 may be transferred across the second clutch 186 to the gear 208, to the gear 210, along the countershaft 212, to the gear 214, to the gear 216, and ultimately to the output shaft 230.

Additionally, in some embodiments, engaging the forward directional clutch 194 and the third clutch 188 may place the powertrain 106 in a second forward directional mode as a further split path mode. Specifically, power from the second electric motor 116b may be transmitted from the shaft 142, to the gear 144, to the gear 148, to the shaft 174, to drive the second sun gear 162. Also, power from the engine 114 is transmitted to the shaft 130, to the gear 132, to the gear 134, to the shaft 136, to the gear 206, through the forward directional clutch 194, to the shaft 168, to the second planet gears and associated carrier 164. Combined power from the second electric motor 116b and the engine 114 may be summed at the second ring gear 166, and may be transmitted to the gear 172, to the gear 220, through the third clutch 188, to the gear 222, to the gear 210, to the countershaft 212, to the gear 214, to the gear 216, and ultimately to the output shaft 230.

In addition, in some embodiments, engaging the forward directional clutch 194 and the fourth clutch 190 may place the powertrain 106 in a third forward directional mode as a further split path mode. Specifically, power from the second electric motor 116b is transmitted from the shaft 142, to the gear 144, to the gear 148, to the shaft 174, to drive the first sun gear 154. Also, power from the engine 114 is transmitted to the shaft 130, to the gear 132, to the gear 134, to the shaft 136, to the gear 206, through the forward directional clutch 194, to the shaft 168, to the second planet gears and associated carrier 164, to the first ring gear 158. Combined power from the second electric motor 116b and the engine 114 is summed at the first planet gears and the associated carrier 156 and is transmitted via the gear 176 and the gear 178 to the shaft 180. Power at the shaft 180 may be transferred across the fourth clutch 190 to the gear 210, to the gear 226, along the countershaft 212, to the gear 214, to the gear 216, and ultimately to the output shaft 230.

Moreover, in some embodiments, engaging the forward directional clutch 194 and the fifth clutch 192 may place the powertrain 106 in a fourth forward directional mode as a further split path mode. Specifically, power from the second electric motor 116b may be transmitted from the shaft 142, to the gear 144, to the gear 148, to the shaft 174, to drive the second sun gear 162. Also, power from the engine 114 is transmitted to the shaft 130, to the gear 132, to the gear 134, to the shaft 136, to the gear 206, through the forward directional clutch 194, to the shaft 168, to the second planet gears and associated carrier 164. Combined power from the second electric motor 116b and the engine 114 may be summed at the second ring gear 166, and may be transmitted to the gear 172, to the gear 220, through the fifth clutch 192, to the gear 228, to the gear 226, to the countershaft 212, to the gear 214, to the gear 216, and ultimately to the output shaft 230.

The powertrain 106 may also have one or more reverse modes for driving the work vehicle 100 in the opposite (reverse) direction from those modes discussed above. In some embodiments, the powertrain 106 may provide a reverse series mode, which corresponds to the forward series mode discussed above in which the first clutch 184 and the second clutch 186 may be engaged such that the second electric motor 116b drives the shaft 142 and the other downstream components in the opposite direction from that described above to move the work vehicle 100 in reverse.

Moreover, the powertrain 106 may have a plurality of split path reverse directional modes. In some embodiments, the powertrain 106 may provide reverse directional modes that correspond to the forward directional modes discussed above; however, the reverse directional clutch 196 may be engaged instead of the forward directional clutch 194 to achieve the reverse modes.

Accordingly, the powertrain 106 may provide a first reverse directional mode by engaging the reverse directional clutch 196 and the second clutch 186. As such, power from the second electric motor 116b may be transmitted from the shaft 142, to the gear 144, to the gear 148, to the shaft 174, to drive the first sun gear 154. Also, power from the engine 114 may be transmitted to the shaft 130, to the gear 132, to the gear 134, to the shaft 136, to the gear 206, to the idler gear 204, to the gear 202, through the reverse directional clutch 196, to the gear 200 to the gear 170, to the shaft 168, to the second planet gears and associated carrier 164 to the first ring gear 158. Combined power from the second electric motor 116*b* and the engine 114 may be summed at the first planet gears and the associated carrier 156 and may be transmitted via the gear 176 and the gear 178 to the shaft 180. Power at the shaft 180 may be transferred across the second clutch 186 to the gear 208, to the gear 210, along the countershaft 212, to the gear 214, to the gear 216, and ultimately to the output shaft 230.

The powertrain 106 may also provide a second reverse directional mode by engaging the reverse directional clutch 196 and the third clutch 188. As such, power from the second electric motor 116*b* may be transmitted from the shaft 142, to the gear 144, to the gear 148, to the shaft 174, to drive the second sun gear 162. Also, power from the engine 114 may be transmitted to the shaft 130, to the gear 132, to the gear 134, to the shaft 136, to the gear 206, to the idler gear 204, to the gear 202, through the reverse directional clutch 196, to the gear 200, to the gear 170, to the shaft 168, to the second planet gears and associated carrier 164. Combined power from the second electric motor 116*b* and the engine 114 may be summed at the second ring gear 166, and may be transmitted to the gear 172, to the gear 220, through the third clutch 188, to the gear 222, to the gear 210, to the countershaft 212, to the gear 214, to the gear 216, and ultimately to the output shaft 230.

In addition, in some embodiments, engaging the reverse directional clutch 196 and the fourth clutch 190 may place the powertrain 106 in a third reverse directional mode. Specifically, power from the second electric motor 116*b* may be transmitted from the shaft 142, to the gear 144, to the gear 148, to the shaft 174, to drive the first sun gear 154. Also, power from the engine 114 may be transmitted to the shaft 130, to the gear 132, to the gear 134, to the shaft 136, to the gear 206, to the idler gear 204, to the gear 202, through the reverse directional clutch 196, to the gear 200, to the gear 170 to the shaft 168, to the second planet gears and associated carrier 164, to the first ring gear 158. Combined power from the second electric motor 116*b* and the engine 114 may be summed at the first planet gears and the associated carrier 156 and may be transmitted via the gear 176 and the gear 178 to the shaft 180. Power at the shaft 180 may be transferred across the fourth clutch 190 to the gear 210, to the gear 226, along the countershaft 212, to the gear 214, to the gear 216, and ultimately to the output shaft 230.

Moreover, in some embodiments, engaging the reverse directional clutch 196 and the fifth clutch 192 may place the powertrain 106 in a fourth reverse directional mode. Specifically, power from the second electric motor 116*b* may be transmitted from the shaft 142, to the gear 144, to the gear 148, to the shaft 174, to drive the second sun gear 162. Also, power from the engine 114 may be transmitted to the shaft 130, to the gear 132, to the gear 134, to the shaft 136, to the gear 206, to the idler gear 204, to the gear 202, through the reverse directional clutch 196, to the gear 200, to the gear 170, to the shaft 168, to the second planet gears and associated carrier 164. Combined power from the second electric motor 116*b* and the engine 114 may be summed at the second ring gear 166, and may be transmitted to the gear 172, to the gear 220, through the fifth clutch 192, to the gear 228, to the gear 226, to the countershaft 212, to the gear 214, to the gear 216, and ultimately to the output shaft 230.

Furthermore, the powertrain 106 may provide one or more direct drive modes, in which power from the engine 114 is transferred to the output shaft 230 and power from the second electric motor 116*b* is prevented from transferring to the output shaft 230. Specifically, engaging the second clutch 186, the third clutch 188, and the forward directional clutch 194 may provide a first forward direct drive mode. As such, power from the engine 114 may transfer from the shaft 130, to the gear 132, to the shaft 136, to the gear 206, through the forward directional clutch 194, to the second planet gears and carrier 164, and to the first ring gear 158. Moreover, with the second and third clutches 186, 188 engaged, the second ring gear 166 and the first planet gears and carrier 156 lock in a fixed ratio to the countershaft 212 and, thus, the output shaft 230. This effectively constrains the ratio of each side of the variator 150 and locks the engine speed directly to the ground speed of the work vehicle 100 by a ratio determined by the tooth counts of the engaged gear train. In this scenario, the speed of the sun gears 154, 162 is fixed and the sun gears 154, 162 carry torque between the two sides of the variator 150. Furthermore, the first electric motor 116*a* and the second electric motor 116*b* may be unpowered.

Similarly, engaging the fourth clutch 190, the fifth clutch 192, and the forward directional clutch 194 may provide a second forward direct drive mode. Furthermore, engaging the second clutch 186, the third clutch 188, and the reverse directional clutch 196 may provide a first reverse direct drive mode. Also, engaging the fourth clutch 190, the fifth clutch 192, and the reverse directional clutch 196 may provide a second reverse direct drive mode. As introduced above, the controller 104 is coupled to control various aspects of the power control system 102, including the engine 114 and transmission 118 to implement the engine throttle shift function.

Figure 3:
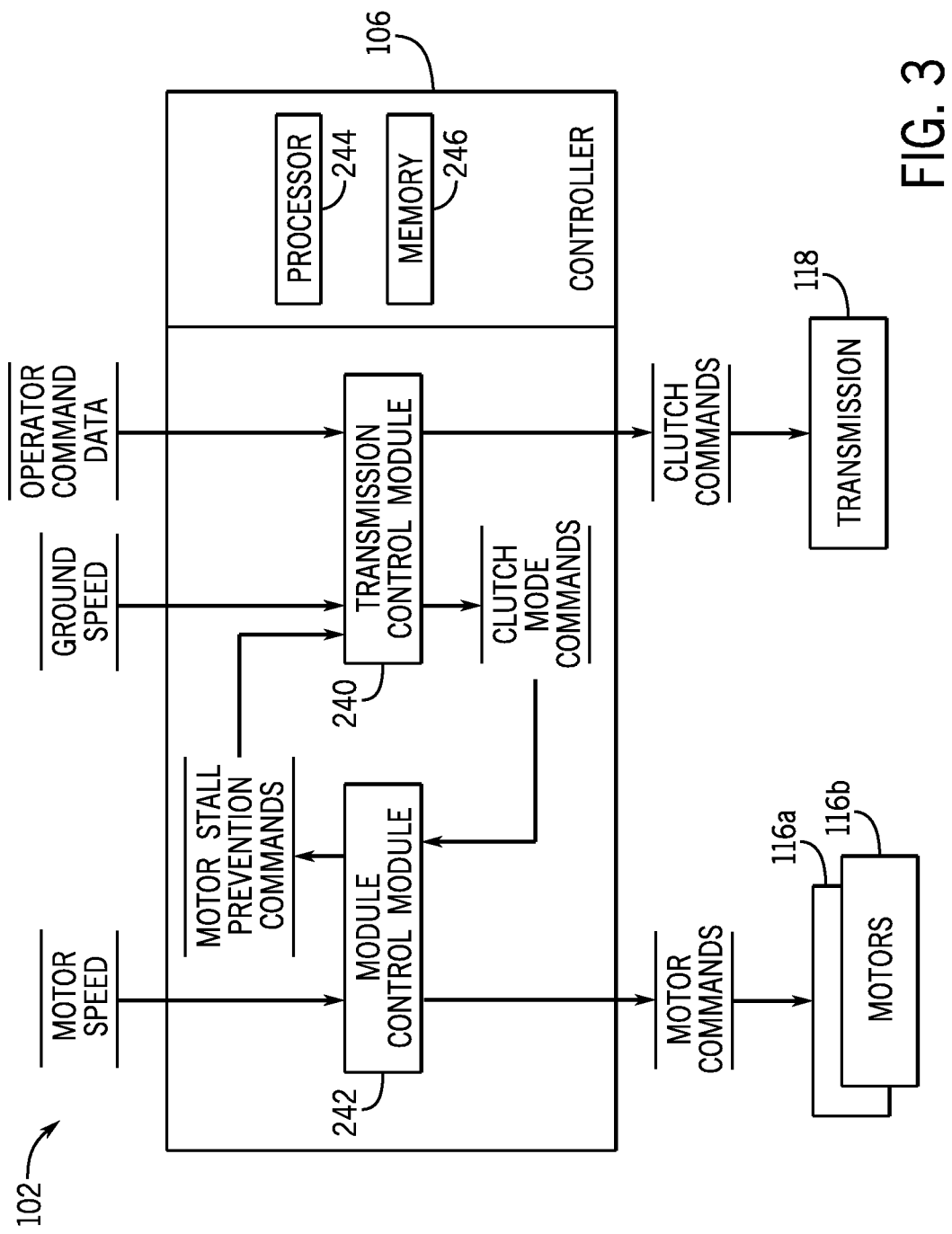
FIG. 3 is a dataflow diagram of a controller for implementing the clutch modulation function of the power control system in accordance with an example embodiment.

Referring now also to FIG. 3, a dataflow diagram illustrates an embodiment of the power control system 102 implemented by the controller 104, engine 114, and transmission 118 to execute the clutch modulation function for motor stall prevention and/or mitigation. Generally, the controller 104 may be considered a vehicle controller, a dedicated controller, or a combination of engine and/or transmission controllers. With respect to the power control system 102 of FIG. 3, the controller 104 may be organized as one or more functional units or modules 240, 242 (e.g., software, hardware, or combinations thereof). As can be appreciated, the modules 240, 242 shown in FIG. 3 may be combined and/or further partitioned to carry out similar functions to those described herein. As an example, each of the modules 240, 242 may be implemented with processing architecture such as a processor 244 and memory 246, as well as suitable communication interfaces. For example, the controller 104 may implement the modules 240, 242 with the processor 244 based on programs or instructions stored in memory 246. In some examples, the consideration and implementation of the clutch modulation function by the controller 104 are continuous, e.g., constantly active. In other examples, the activation of the engine throttle shift function may be selective, e.g., enabled or disabled based on input from the operator or other considerations. In any event, the engine throttle function may be enabled and implemented by the power control system 102, as described below.

Generally, the controller 104 may receive input data in a number of forms and/or from a number of sources, including sensors 110, although such input data may also come in from other systems or controllers, either internal or external to the work vehicle 100. This input data may represent any data sufficient to operate the motors 116a, 116b, engine 114, and/or transmission 118, particularly any data sufficient to carry out the clutch modulation function described below.

In one example, the controller 104 may be considered to include a transmission control module 240 and a motor control module 242. In general, the transmission control module 240 is configured to generate clutch commands to operate the transmission 118 based on various types of data, including ground speed and operator input, as shown. The clutch commands may be generated at "shift points" in which the commands result in the clutches (e.g., clutches 184, 184, 188, 190, 192, 194, 196 of FIG. 2) of the transmission 118 providing a new gear or speed ratio at the output (e.g., shaft 230 of FIG. 2). Such operation may be implemented based on one or more shift schedules stored in memory 246. As described below, the transmission control module 240 may also implement at least a portion of the clutch modulation function.

In general, the motor control module 242 may generate commands to operate one or more of the motors 116a, 116b, including commands associated with the typical operation of the motors 116a, 116b, such as speed commands, shut downs, timings, etc. The motor commands may be based on a number of factors, including the current motor speed. Other parameters impacting the motor commands generated by the motor control module 242 may include operational parameters and operator input via the operator interface 122 (FIG. 1), as well as the current and intended mode or gear ratio commanded by the transmission control module 240. In some example, the motor commands may be generated based on a predetermined operational schedule stored in memory 246.

During typical operation (e.g., without the clutch modulation function), the transmission control module 240 generates commands for the various clutches of the transmission 118 to implement the scheduled transmission mode such that selected clutches are fully engaged or fully disengaged; and the motor control module 242 generates associated motor commands, particularly speed commands. As described below, the motor control module 242 and/or the transmission control module 240 may implement the clutch modulation function to improve the powertrain performance under certain conditions.

In particular, during operation, the motor control module 242 may received clutch mode commands (on which the clutch commands for the transmission 118 are based) in order to monitor the current mode of the transmission 118. In one example, the motor control module 242 may identify and/or be notified when the transmission 118 is in a series mode, e.g., when the output torque of the transmission 118 is being provided by the second motor 116b. The motor control module 242 may also monitor the motor speed, e.g., the speed of electric motor 116b in the example of FIG. 2. Other parameters may be considered, such as output or ground speed. In any event, the motor control module 242 may determine when the conditions of the powertrain 106 are such that the second motor 116b (and/or other motors 116a) may be approaching or fallen below a stall speed threshold, typically as a result of a slowing vehicle 100 or transmission 118. In other words, the motor control module 242 may identify when the vehicle 100 has encountered a situation in which the counterforce on the vehicle 100 or transmission 118 is slowing the motor 116b, such as when engaging a heavy load or traveling up a steep incline that may result in motor stall.

Generally, the stall speed threshold is the speed threshold at which the motor may be adversely impacted by the inability to rotate properly, such as upon asymmetric phase or winding usage. Typically, the motor control module 242 (and/or other module or system) may derate or reduce the torque capability of the subject motor in these conditions to avoid heat issues. The stall speed threshold may be based on the size or type of the motor. In one example, the stall speed threshold may be 25 rpms, 50 rpms, 100 rpms, 250 rpms or 500 rpms, although any suitable stall speed threshold may be considered.

Figure 4A:
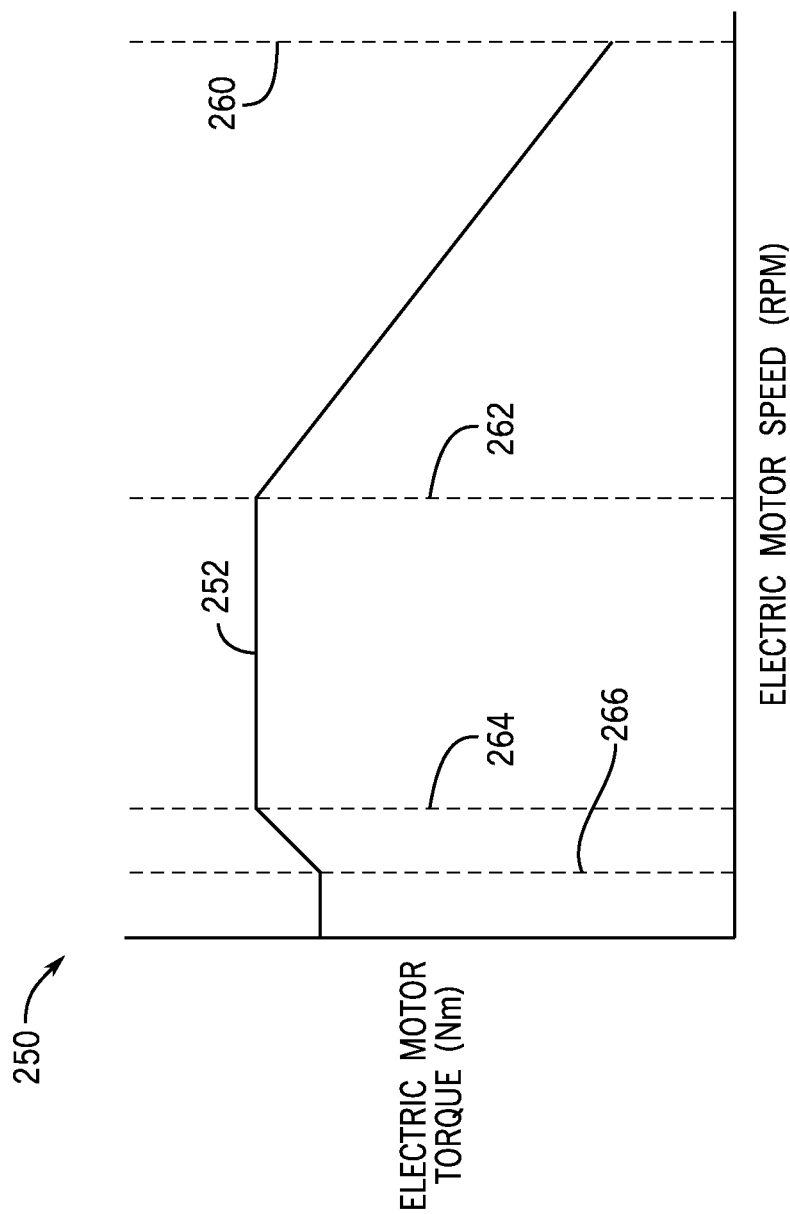
FIG. 4A is a data representation of motor torque capability in view of motor speed providing an example of considerations during operation of the clutch modulation function in accordance with an example embodiment.

Reference is briefly made to FIG. 4A, which is an example data representation 250 of motor performance in view of motor speed. In particular, the representation 250 of FIG. 4A depicts electric motor torque capability (Nm) as a function of electric motor speed (RPM). The representation 250 further depicts various reference speeds 260, 262, 264, 266. Reference speed 260 is the electric motor maximum speed; reference speed 262 is the electric motor base speed; reference speed 264 is the stall speed threshold; and reference speed 266 is a further stall speed threshold. As shown, the torque capability is maximum in between the stall speed threshold 264 and the electric motor base speed 262. At speeds above the electric motor base speed 262, the torque capability decreases, including decreasing until reaching the electric motor maximum speed 260. At speeds below the stall speed threshold 264, the electric motor is derated, as reflected by the decrease in torque capability. The torque capability continues to decrease from the stall speed threshold 264 until the further stall speed threshold 266, at which the decreased torque capability is maintained at a constant value. As described below, the clutch modulation function attempts to maintain the electric motor at speeds above the stall speed threshold (e.g., threshold 264) to maximize the torque capability of the electric motor.

Returning to FIG. 3 and as discussed above, the motor control module 242 may monitor the motor speed relative to a stall speed threshold in order to identify a motor stall condition, and upon identification, the motor control module 242 may generate motor stall prevention commands for the transmission control module 240. In one example, the motor control module 242 particularly monitors the electric motor 116b, which as referenced below is responsible for providing the torque to the transmission 118 in the series mode. As noted above, in some examples, the motor control module 242 may only generate the motor stall prevention commands when the transmission is in a series mode, although in other examples, the motor control module 242 may generate the motor stall prevention commands for the transmission control module 240 independently of the clutch mode, e.g., in modes other than series modes.

Upon receipt of the motor stall prevention commands, the transmission control module 240 may generate modified clutch commands (e.g., clutch commands with clutch modulation commands for at least one clutch) in accordance with the clutch modulation function in order to address the potential stall of motor 116b. Generally, the clutch commands generated according to the clutch modulation function operate to "modulate" (or partially engage) an otherwise engaged clutch within the power flow path of the transmission 118. For example, in the first forward mode described above with reference to FIG. 2, which is also a series mode, the clutch commands may operate to modulate the first clutch 184 that couples the second motor 116b to other portions of the transmission 118. In another example, in the first forward mode described above with reference to FIG. 2, the clutch commands may operate to modulate the second clutch 186 that couples the second motor 116b to other portions of the transmission 118. In further examples, both clutches 184, 186 may be modulated. Generally, the transmission control module 242 may select the clutch or clutches most suitable for modulation, e.g., clutch or clutches that may accommodate the heat or friction of the clutch slip associated with modulation.

The clutch modulation operates to at least partially decouple the electric motor 116b from the slowing transmission 118. In particular, a power flow clutch (e.g., clutch 184) is allowed to slip such that the clutch element on the input side of the power flow path (e.g., on the side of the electric motor 116b) is allowed to move at a higher speed than the opposite clutch element on the output side (e.g., on the side of the output shaft 230).

The clutch modulation may be implemented in various ways. In one example, the clutch modulation may occur by dithering the selected clutch (e.g., a regular and rapid increase and decreases over a defined bandwidth relative to a mean of the resultant pressure at the clutch). Such dithering may be increasing or decreasing step forms, sawtooth forms, sinusoidal forms, and/or other shapes or functions (e.g., as an open loop function). In an example, upon initiating clutch modulation with dithering, the controller 104 may initially command the clutch torque to drop from an engaged pressure to a reduced clutch pressure lower than a normal or engaged clutch pressure. The reduced clutch pressure may be a function of a schedule or determined as a function of motor speed or output speed. The clutch pressure may subsequently stepped up and down (e.g., to oscillate or alternate) at approximately equal amplitudes. The resulting mean clutch pressure may increase or decrease with the motor speed and terminate when the motor speed reaches a sufficient value. In other examples, the power control system may implement the clutch modulation by targeting an intermediate or partially engaged resultant pressure at the clutch (e.g., as a closed loop function).

As a result of the clutch modulation, the electric motor 116b may be able to reach and/or maintain a speed above the stall speed threshold. The controller 104 may continue to monitor the parameters and maintain the clutch modulation until the conditions are such that the clutch modulation function is no longer necessary. In particular, the controller 104 may terminate the clutch modulation function when the ground speed or transmission output speed is greater than the stall speed threshold of the electric motor 116b. At that point, the motor control module 242 may terminate the motor stall prevention commands resulting in the clutch modulation function, and the transmission control module 240 may generate clutch commands such that previously modulated clutch (e.g., clutch 184) is fully engaged, e.g., normal or nominal operation. Additional details will be provided below.

Figure 4B:
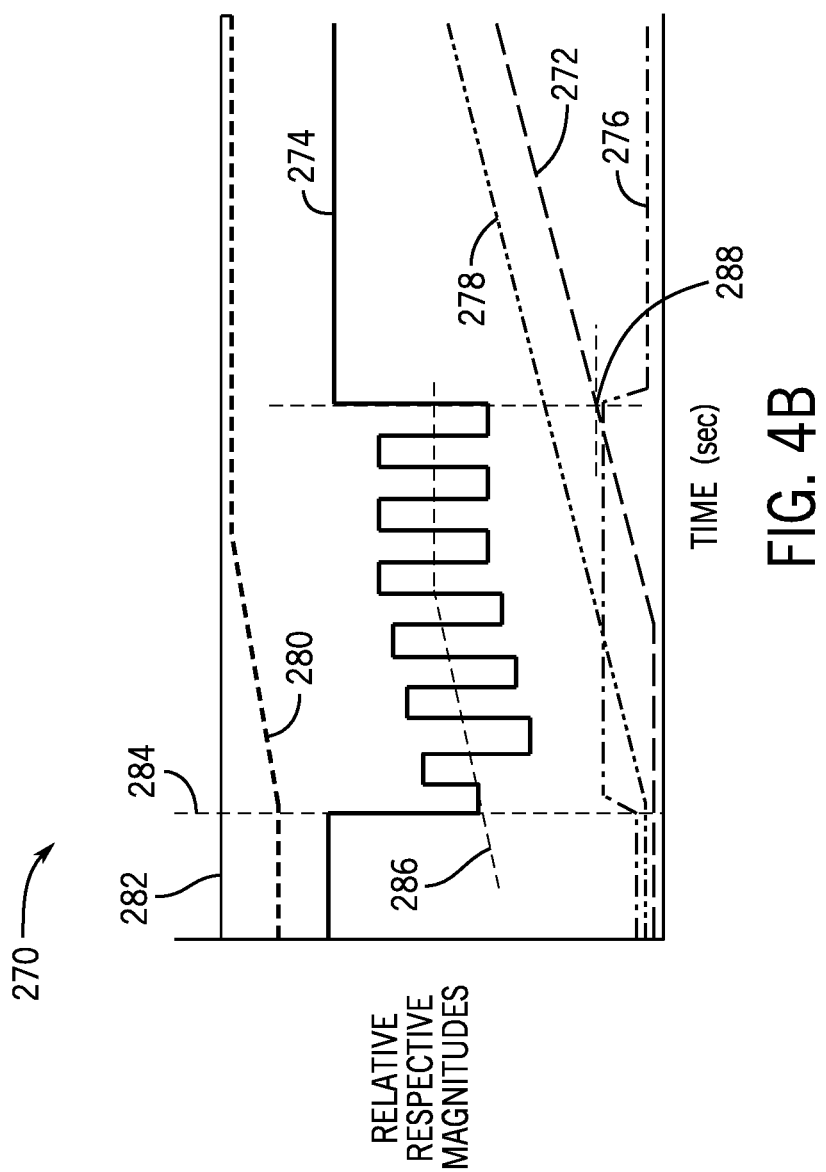
FIG. 4B is a data representation of various parameters without operation of the clutch modulation function.

Reference is now made to FIG. 4B, which is a data representation 270 depicting powertrain parameters prior to, during, and subsequent to implementation of the stall prevention clutch modulation function. In particular, the data representation 270 depicts respective relative magnitudes of the various parameters on the vertical axis as a function of time on the horizontal axis.

The data representation 270 includes a first line 272 reflecting the transmission output speed (e.g., at output shaft 230) over time; a second line 274 reflecting the clutch torque (e.g., for the clutch associated with the clutch modulation function, such as clutch 184) over time; a third line 276 reflecting the relative clutch element speed (e.g., representing the amount of clutch slip) over time; a fourth line 278 reflecting the electric motor speed (e.g., electric motor 116b) over time; a fifth line 280 reflecting the delivered or current electric motor torque capability over time; a sixth line 282 reflecting the command or desired electric motor torque over time; a seventh line or reference point 284 reflecting the initiation of the clutch modulation function; an eighth line 286 reflecting an effective or mean clutch torque (e.g., for the modulated clutch torque of line 274); and a ninth line or reference point 288 reflecting the point at which the transmission output speed 272 exceeds the electric motor speed 278.

As shown, the clutch modulation function is initiated (represented at point 284) when the transmission output speed 272 is relatively low (e.g., at a stall speed threshold). Prior to point 284, the clutch torque 274 is fully engaged such that the relative clutch element speed 276 is approximately zero; and since the transmission output speed 272 is approximately zero, the clutch torque 274 is fully engaged, and the electric motor speed 278 is relatively low, the electric motor delivered torque 280 is less than the desired electric motor torque 282. In other words, prior to implementing the clutch modulation function at point 284, the electric motor may not be delivering the desired torque.

At point 284, the clutch modulation function is initiated, and in particular, the clutch (e.g., clutch 184) is subject to dither. As the clutch is dithered, the clutch torque 274 is initially reduced and subsequently undergoes relatively quick increases and decreases about an average amplitude or magnitude 286, such that the relative clutch element speed 276 is increased (e.g., clutch slip occurs), which in turn enables the electric motor speed 278 to increase. As shown, the delivered torque 280 increases as the electric motor speed 278 increases.

At point 288, the output speed 272 of the transmission is such that full engagement of the clutch would no longer result in the electric motor having a speed 278 that would stall the electric motor. As a result, the stall prevention modulation function may be terminated and the clutch torque 274 may be such that the clutch is fully engaged, e.g., such that the relative clutch element speed 276 is reduced to zero. Subsequently, the electric motor continues to increase in speed 278 and continues to deliver the requested torque 280.

The power control system discussed herein may further be embodied as a method for controlling a powertrain of a work vehicle. In particular, the method includes initiating, monitoring, with a controller, an electric motor speed of the at least one electric motor; and generating and executing, at the controller, a clutch modulation command for the transmission such that at least one of the plurality of clutches along the power flow path is partially engaged when the electric motor speed is less than a first predetermined stall speed threshold. The generating and executing step may include generating and executing the clutch modulation command such that the at least one clutch is dithered. Further, the generating and executing step may include generating and executing the clutch modulation command such that the at least one clutch is subject to repeated modulations in clutch pressure between higher and lower amplitudes. The method may be terminated when the electric motor speed exceeds the first predetermined stall speed threshold.

Accordingly, the present disclosure provides a power control system and method for a work vehicle powertrain having an engine and at least one electric motor generating power conditioned by a transmission such as an eIVT. In particular, the power control system and method provide improved performance and efficiency, specifically in low speed, high torque applications.

Also, the following examples are provided, which are numbered for easier reference.

1. A control system for a work vehicle comprising: a power source including an engine and at least one electric motor configured to generate power; a transmission including a plurality of clutches coupled together and configured for selective engagement to transfer the power from the engine and the at least one electric motor along a power flow path to drive an output shaft of a powertrain of the work vehicle according to a plurality of transmission modes; and a controller coupled to the power source and the transmission, the controller having a processor and memory architecture configured to: monitor an electric motor speed of the at least one electric motor; and generate and execute, when the electric motor speed is less than a first predetermined stall speed threshold, a clutch modulation command for the transmission such that at least one clutch of the plurality of clutches along the power flow path is partially engaged.

2. The control system of example 1, wherein the controller is configured to generate and execute the clutch modulation command such that the at least one clutch is dithered.

3. The control system of example 1, wherein the controller is configured to generate and execute the clutch modulation command such that the at least one clutch is subject to repeated modulations in clutch pressure between higher and lower amplitudes.

4. The control system of example 1, wherein the controller is configured to generate and execute the clutch modulation command such that the at least one clutch is subject to repeated modulations in clutch pressure between higher and lower amplitudes.

5. The control system of example 4, wherein the controller is configured to generate and execute the clutch modulation command such that the repeated modulation occurs subsequent to an initial drop in clutch pressure at an initiation of the clutch modulation command.

6. The control system of example 5, wherein the controller is configured to continue the repeated modulation about a mean resultant clutch pressure that increases as the electric motor speed increases.

7. The control system of example 1, wherein, upon generation and execution of the clutch modulation command, the controller is configured to continue to monitor the electric motor speed and to terminate the clutch modulation command when the electric motor speed exceeds the first predetermined stall speed threshold.

8. The control system of example 1, wherein the plurality of transmission modes includes a series mode in which the output shaft of the powertrain is driven primarily by power from the at least one electric motor and a split mode in which the output shaft of the power is driven by combined power from the engine and the at least one electric motor, and wherein the controller is configured to generate and execute the clutch modulation command when the electric motor speed is less than the first predetermined stall speed threshold and the transmission is operating in the series mode.

9. The control system of example 1, wherein the transmission is an electrical infinitely variable transmission (eIVT).

10. A controller for a work vehicle with an engine and at least one electric motor configured to generate power and a transmission with a plurality of clutches coupled together and configured for selective engagement to transfer the power from the engine and the at least one electric motor along a power flow path to drive an output shaft according to a plurality of transmission modes, the controller comprising: a processor and memory architecture configured to: monitor an electric motor speed of the at least one electric motor; and generate and execute, when the electric motor speed is less than a first predetermined stall speed threshold, a clutch modulation command for the transmission such that at least one clutch of the plurality of clutches along the power flow path is partially engaged.

11. The controller of example 10, wherein the processor and memory are further configured to generate and execute the clutch modulation command such that the at least one clutch is dithered.

12. The controller of example 10, wherein the processor and memory are further configured to generate and execute the clutch modulation command such that the at least one clutch is subject to repeated modulations in clutch pressure between higher and lower amplitudes.

13. The controller of example 10, wherein the processor and memory are further configured such that the at least one clutch is subject to repeated modulations in clutch pressure between higher and lower amplitudes.

14. The controller of example 13, wherein the processor and memory are further configured such that the repeated modulation occurs subsequent to an initial drop in clutch pressure at an initiation of the clutch modulation command.

15. The controller of example 14, wherein the processor and memory are further configured to continue the repeated modulation about a mean resultant clutch pressure that increases as the electric motor speed increases.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

For convenience of notation, "component" may be used herein, particularly in the context of a planetary gear set, to indicate an element for transmission of power, such as a sun gear, a ring gear, or a planet gear carrier. Further, references to a "continuously" variable transmission, power train, or power source will be understood to also encompass, in various embodiments, configurations including an "infinitely" variable transmission, power train, or power source.

In the discussion below, various example configurations of shafts, gears, and other power transmission elements are described. It will be understood that various alternative configurations may be possible, within the spirit of this disclosure. For example, various configurations may utilize multiple shafts in place of a single shaft (or a single shaft in place of multiple shafts), may interpose one or more idler gears between various shafts or gears for the transmission of rotational power, and so on.

As will be appreciated by one skilled in the art, certain aspects of the disclosed subject matter can be embodied as a method, system (e.g., a work machine control system included in a work machine), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

As will be appreciated by one skilled in the art, aspects of the disclosed subject matter can be described in terms of methods, systems (e.g., control or display systems deployed onboard or otherwise utilized in conjunction with work machines), and computer program products. With respect to computer program products, in particular, embodiments of the disclosure may consist of or include tangible, non-transitory storage media storing computer-readable instructions or code for performing one or more of the functions described throughout this document. As will be readily apparent, such computer-readable storage media can be realized utilizing any currently-known or later-developed memory type, including various types of random access memory (RAM) and read-only memory (ROM). Further, embodiments of the present disclosure are open or "agnostic" to the particular memory technology employed, noting that magnetic storage solutions (hard disk drive), solid state storage solutions (flash memory), optimal storage solutions, and other storage solutions can all potentially contain computer-readable instructions for carrying-out the functions described herein. Similarly, the systems or devices described herein may also contain memory storing computer-readable instructions (e.g., as any combination of firmware or other software executing on an operating system) that, when executed by a processor or processing system, instruct the system or device to perform one or more functions described herein. When locally executed, such computer-readable instructions or code may be copied or distributed to the memory of a given computing system or device in various different manners, such as by transmission over a communications network including the Internet. Generally, then, embodiments of the present disclosure should not be limited to any particular set of hardware or memory structure, or to the particular manner in which computer-readable instructions are stored, unless otherwise expressly specified herein.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The term module may be synonymous with unit, component, subsystem, sub-controller, circuitry, routine, element, structure, control section, and the like.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of work vehicles.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A control system for a work vehicle comprising:
  a power source including an engine and at least one electric motor configured to generate power;
  a transmission including a plurality of clutches coupled together and configured for selective engagement to transfer the power from the engine and the at least one electric motor along a power flow path to drive an output shaft of a powertrain of the work vehicle according to a plurality of transmission modes; and
  a controller coupled to the power source and the transmission, the controller having a processor and memory architecture configured to:
    monitor an electric motor speed of the at least one electric motor; and
    generate and execute, when the electric motor speed is less than a first predetermined stall speed threshold, a clutch modulation command for the transmission such that at least one clutch of the plurality of clutches along the power flow path is partially engaged.

2. The control system of claim 1, wherein the controller is configured to generate and execute the clutch modulation command such that the at least one clutch is dithered.

3. The control system of claim 1, wherein the controller is configured to generate and execute the clutch modulation command such that the at least one clutch is subject to repeated modulations in clutch pressure between higher and lower amplitudes.

4. The control system of claim 3, wherein the controller is configured to generate and execute the clutch modulation command such that the repeated modulation occurs subsequent to an initial drop in clutch pressure at an initiation of the clutch modulation command.

5. The control system of claim 4, wherein the controller is configured to continue the repeated modulation about a mean resultant clutch pressure that increases as the electric motor speed increases.

6. The control system of claim 1, wherein, upon generation and execution of the clutch modulation command, the controller is configured to continue to monitor the electric motor speed and to terminate the clutch modulation command when the electric motor speed exceeds the first predetermined stall speed threshold.

7. The control system of claim 1,
wherein the plurality of transmission modes includes a series mode in which the output shaft of the powertrain is driven primarily by power from the at least one electric motor and a split mode in which the output shaft of the powertrain is driven by combined power from the engine and the at least one electric motor, and
wherein the controller is configured to generate and execute the clutch modulation command when the electric motor speed is less than the first predetermined stall speed threshold and the transmission is operating in the series mode.

8. The control system of claim 1, wherein the transmission is an electrical infinitely variable transmission (eIVT).

9. A controller for a work vehicle with an engine and at least one electric motor configured to generate power and a transmission with a plurality of clutches coupled together and configured for selective engagement to transfer the power from the engine and the at least one electric motor along a power flow path to drive an output shaft of a powertrain according to a plurality of transmission modes, the controller comprising:
a processor and memory architecture configured to:
monitor an electric motor speed of the at least one electric motor; and
generate and execute, when the electric motor speed is less than a first predetermined stall speed threshold, a clutch modulation command for the transmission such that at least one clutch of the plurality of clutches along the power flow path is partially engaged.

10. The controller of claim 9, wherein the processor and memory are further configured to generate and execute the clutch modulation command such that the at least one clutch is dithered.

11. The controller of claim 9, wherein the processor and memory are further configured such that the at least one clutch is subject to repeated modulations in clutch pressure between higher and lower amplitudes.

12. The controller of claim 11, wherein the processor and memory are further configured such that the repeated modulation occurs subsequent to an initial drop in clutch pressure at an initiation of the clutch modulation command.

13. The controller of claim 12, wherein the processor and memory are further configured to continue the repeated modulation about a mean resultant clutch pressure that increases as the electric motor speed increases.

14. The controller of claim 9, wherein the processor and memory are further configured to continue to monitor the electric motor speed and to terminate the clutch modulation command when the electric motor speed exceeds the first predetermined stall speed threshold.

15. The controller of claim 9,
wherein the plurality of transmission modes includes a series mode in which the output shaft of the powertrain is driven primarily by power from the at least one electric motor and a split mode in which the output shaft of the powertrain is driven by combined power from the engine and the at least one electric motor, and
wherein the processor and memory are further configured to generate and execute the clutch modulation command when the electric motor speed is less than the first predetermined stall speed threshold and the transmission is operating in the series mode.

16. A method of operating a powertrain of a work vehicle with an engine and at least one electric motor configured to generate power and a transmission with a plurality of clutches coupled together and configured for selective engagement to transfer the power from the engine and the at least one electric motor along a power flow path to drive an output shaft according to a plurality of transmission modes, the method comprising:
monitoring, with a controller, an electric motor speed of the at least one electric motor; and
generating and executing, at the controller, a clutch modulation command for the transmission such that at least one clutch of the plurality of clutches along the power flow path is partially engaged when the electric motor speed is less than a first predetermined stall speed threshold.

17. The method of claim 16, wherein the generating and executing step includes generating and executing the clutch modulation command such that the at least one clutch is dithered.

18. The method of claim 16, wherein the generating and executing step includes generating and executing the clutch modulation command such that the at least one clutch is subject to repeated modulations in clutch pressure between higher and lower amplitudes.

* * * * *